May 23, 1939.　　　　O. C. SCHMIDT　　　　2,159,623
DROPPER FOR CARCASSES AND THE LIKE
Filed March 23, 1938　　　3 Sheets-Sheet 1

INVENTOR:
Oscar C. Schmidt,
by his Attorney

May 23, 1939.　　　O. C. SCHMIDT　　　2,159,623
DROPPER FOR CARCASSES AND THE LIKE
Filed March 23, 1938　　　3 Sheets-Sheet 2
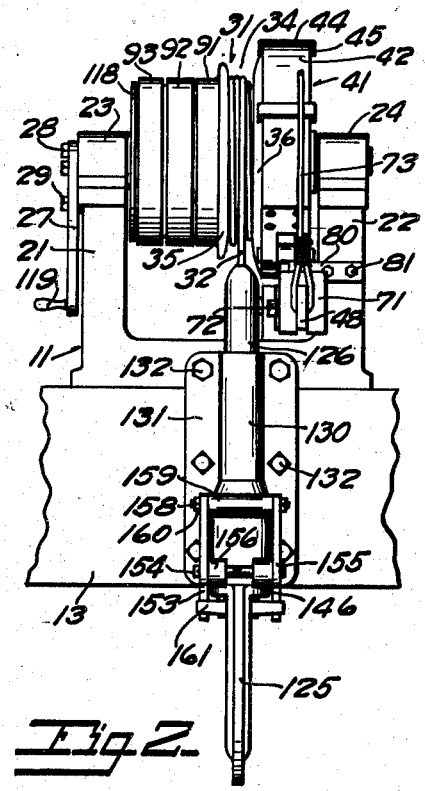
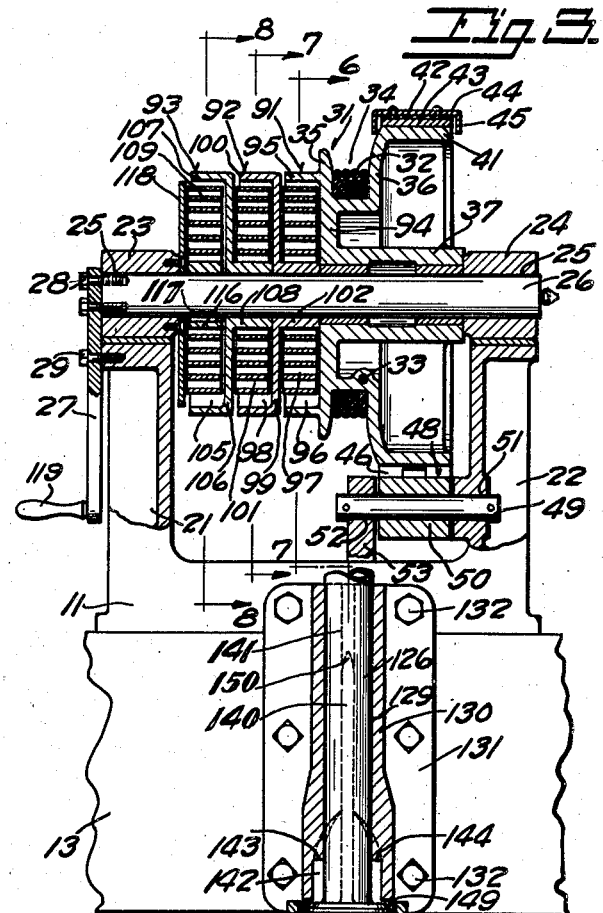
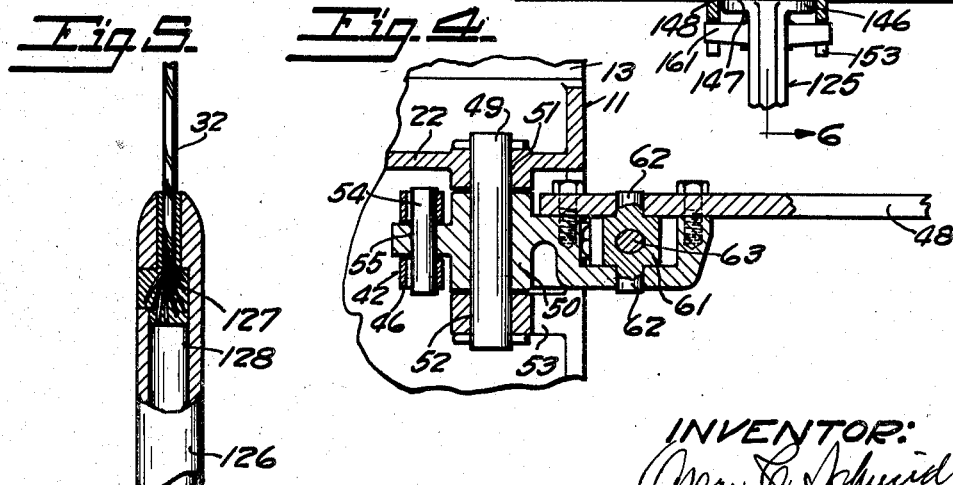
INVENTOR:

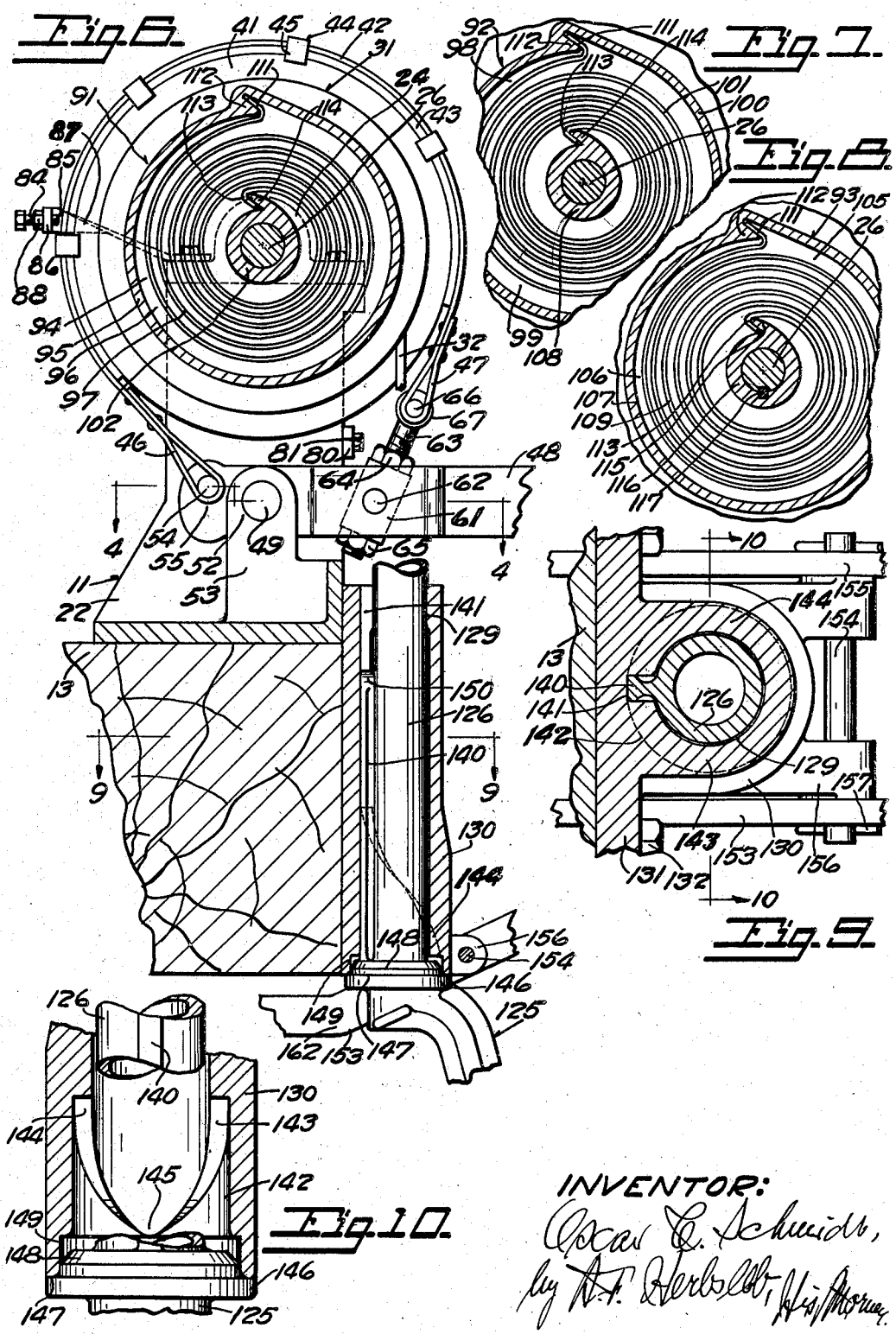

Patented May 23, 1939

2,159,623

UNITED STATES PATENT OFFICE 2,159,623

DROPPER FOR CARCASSES AND THE LIKE

Oscar C. Schmidt, Cincinnati, Ohio, assignor to The Cincinnati Butchers' Supply Company, Cincinnati, Ohio, a corporation of Ohio Application March 23, 1938, Serial No. 197,741

15 Claims. (Cl. 214—95)

My invention relates to droppers for lowering carcasses and parts of carcasses, or supports for the same, from one level to another, and it is the object of my invention to provide simple, economical, efficient and readily controlled means by which the changes in elevation may be accomplished.

My invention consists in novel means for receiving and holding the carcass holder or support, which usually takes the form of a trolley; in novel means for controlling the dropping or lowering thereof; in a novel dropper head; in novel means for controlling the direction of presentation of the dropper head for the carcass holder so as to place it in line with a track from which the carcass holder is received; further, in novel means for blocking the movement of a carcass holder toward the normal position of the dropper head when the latter has been moved out of such normal position; further, in novel means for controlling the position of the arresting means by the dropper head; further, in providing novel means for returning the dropper head to normal position; and, further, in providing novel raising means for the dropper head comprising a plurality of raising units arranged in series, and in providing novel adjusting means for the latter.

The invention will be further readily understood from the following description and claims, and from the drawings, in which latter:

Fig. 2 is a front elevation of my improved device.

Fig. 3 is a vertical cross-section of the same, taken in the plane of the irregular line 3—3 of Fig. 1, and partly broken away.

Fig. 4 is a detail sectional view of the brake controlling means, taken in the plane of the irregular line 4—4 of Fig. 6, and partly broken away.

Fig. 5 is an axial sectional detail view on the line 3—3 of Fig. 1, showing the fastening means between the dropper head and its cable.

Fig. 6 is a cross-section of my improved device, taken in the plane of the irregular line 6—6 of Fig. 3, and partly broken away.

Figure 1:
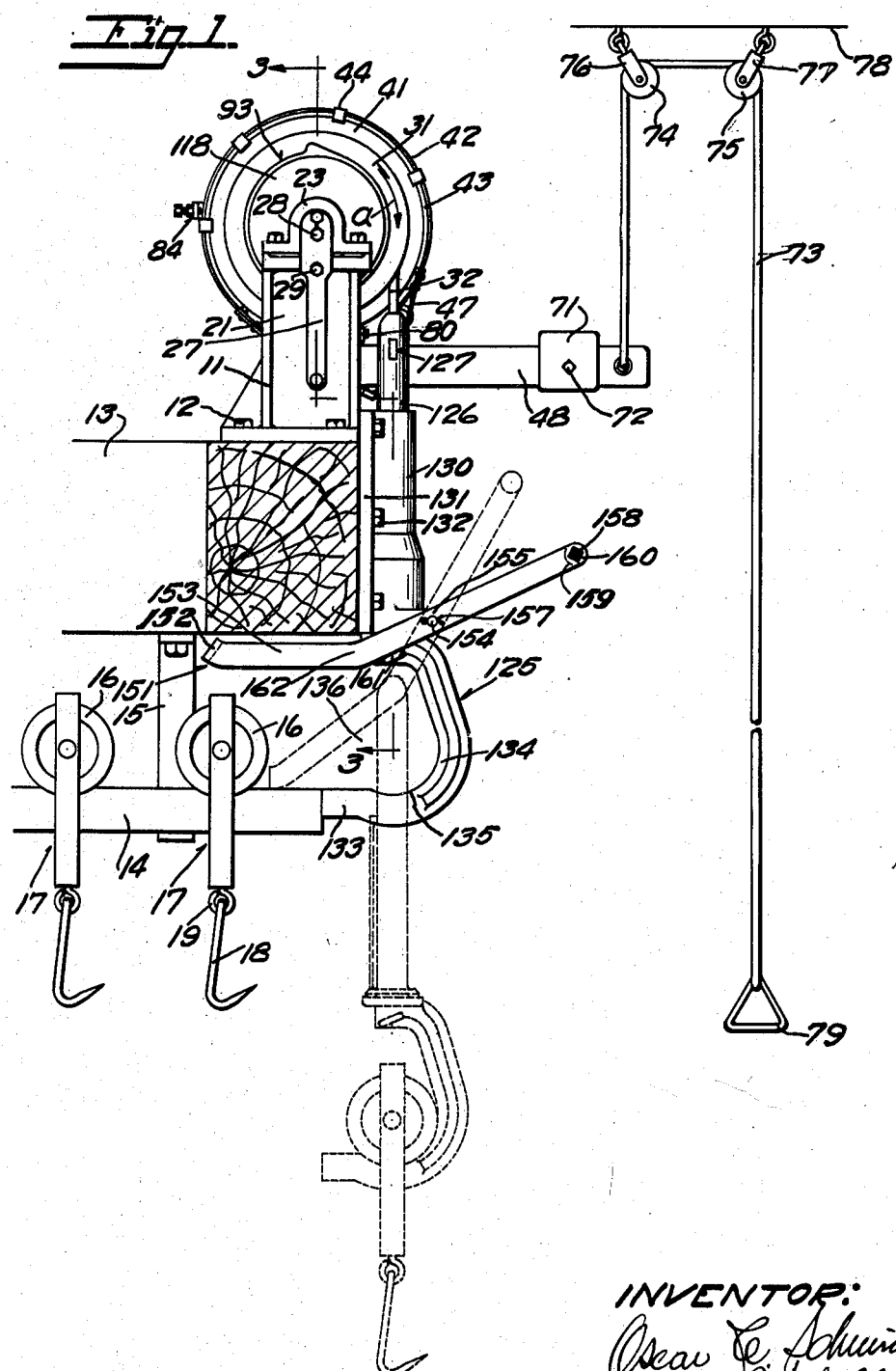
Fig. 1 is a side elevation, partly broken away, of my improved device, shown mounted in association with a usual track rail such as employed in slaughtering and butchering establishments, showing the dropper head for the carcass holder and the safety stop in raised positions in full lines and in assumed positions in dotted lines.

Figs. 7 and 8 are cross-sections of the same, taken respectively in the planes of the lines 7—7 and 8—8 of Fig. 3, and partly broken away.

Fig. 9 is a cross-sectional detail view of the guiding means for the dropper head, taken in the plane of the line 9—9 of Fig. 6; and Fig. 10 is a longitudinal sectional detail view, taken on the line 10—10 of Fig. 9.

A frame 11 is suitably secured as by bolts 12 to the usual timber structure 13, which supports the usual rails 14 by means of usual hangers 15 depending from the timber structure, the lower ends of the track hangers being bent and suitably secured to the track in usual manner so as to provide clearance between them and the top of the track and between the hangers and the rail for permitting passage of the flange of a usual wheel 16 and its mounting on a usual carcass holder 17, traveling on and arranged to be pushed along the track. The holder is exemplified as provided with a hook 18 pivoted to its body portion by a suitable eye connection 19. The carcass or part thereof, or container for the parts of the carcass acted on by my improved device, is arranged to be attached to the hook 19.

The frame 11 has standards 21, 22 extending upwardly therefrom, the upper ends of which have pillow blocks 23, 24 secured thereto. The pillow blocks are provided with bearings 25 in which an axle 26 is located. The axle is held firmly to the frame as by means of an arm 27 fixed to the axle by bolts 28 and to the frame by a bolt 29.

A sheave or reel 31 is journaled about the axle, and has one end of a flexible connection 32, shown as a cable, suitably secured thereto, as at 33, and arranged to be wound upon the reel in the annular recess 34 thereof between flanges 35, 36.

The reel is provided with a drum 41 shown as an annular flange extending from the flange 36, and has a hub 37 to form a bearing for the drum about the axle 26, and to form a brake member, and has a brake band 42 received thereabout, shown provided with a brake lining 43. Retaining cleats 44 are secured to the brake band and are provided with inwardly extending lips 45 at their respective ends located at the respective ends of the brake drum for retaining the brake band on said brake drum.

The respective ends of the brake band are provided with attaching loops 46, 47. A brake lever 48 is pivoted to the frame by means of a pivot pin 49 located in a bearing 50 in the lever, in a bearing 51 in the standard 22, and a bearing 52 in an upwardly extending lug 53 of the frame. The brake lever is provided with a pin 54 in a bearing 55 in the end of the lever, and projecting from the respective sides of said bearing, the loop 46 being bifurcated, the respective ends of said loop being located about said pin and the end of the lever being located in the slot between the bifurcations.

The lever is also provided with a pivot block 61 pivoted thereto on pivot pins 62 so as to form rocking connection therewith. An adjusting shank 63 is located in said block, and is adjustable lengthwise therein by means of nuts 64, 65 threaded thereto at the respective ends of said block.

The adjustable shank 63 is provided with a pin 66, projecting laterally at its respective sides, and the loop 47 of the brake band is bifurcated, the respective ends of the loop being located about said pin, and the head 67 of the threaded shank being located between said bifurcations.

A weight 71 is located on the lever 48 and is adjustable lengthwise thereof for adjusting the tension of the brake band about its drum and is fixed in adjusted positions by means of a set bolt 72, clamping the weight to the lever. A flexible connection 73 has one end thereof secured to the outer end of said lever, and extends upwardly about grooved rollers 74, 75, suitably hung as by hangers 76, 77 from a suitable overhead structure or ceiling 78, the flexible connection 73 then extending downwardly a suitable distance and being provided with a handle 79 in convenient position for being grasped by an operator standing on the floor of the room. The weight applies the braking force to the brake, and the operator relieves this braking force by raising the outer end of the lever by pulling down on the handle 79. Abnormal raising movement of the operated end of the lever beyond what is properly necessary to properly relieve the brake, is prevented by a stop 80, shown as a bar extending above said operated end and fixed to one of the standards by bolts 81.

The attachment of one end of the brake band to the lever is closer to the pivot of the lever than is the attachment of the other end of said brake band to said lever, as will be noted by the relative positions of the pivot pin 49 of the lever, and the pins 54, 62 attaching the respective ends of said band structure to said lever, the axis of the pin 54, being substantially one-half the distance from the axis of the pivot pin 49, as is the distance of the axis of the pin 62 from said pivotal axis. This has the effect of a substantial movement of the outer end of the brake lever and of relieving the brake band at said outer end from contact with the brake drum, and of giving greater control to the operator of the relieving action on said brake band. Upon relieving movement of the brake lever, the pin 54 moves downwardly in an arc about the pivot of said lever, and in a direction which would ordinarily result in tightening of the brake band, the brake drum being rotatable in the direction of the arrow $a$, Fig. 1, when the carcass is being dropped. This is counteracted by the greater movement in opposite direction at the other end of the brake band, by the movement of the pin 62 upwardly in an arc about the axis of the pivot pin of the brake lever, for expanding the diameter of the brake band and moving it radially away from the contact surface of the brake drum.

In order to further control this radial movement, a stop 84 is provided against which a portion of the brake band near its pivotal end of less movement is arranged to impinge, to limit radial movement of that portion of the brake band. This stop is shown in the form of a bolt the inner end of which is normally spaced from the brake band by a space 85 when the brake band impinges against the brake drum.

The bolt is adjustable axially in a branch 86 of a bracket 87 extending from the pillow block 24, being adjustable in a threaded hole in said branch and clamped in adjusted positions by a jam nut 88. When the brake band is expanded by movement of the brake lever, the connection 54 moves slightly about the drum and the connection 62 moves to greater extent about the drum, thereby shifting the brake band slightly about the drum and expanding the brake band. The expanding of the brake band near its first-named connection is arrested by the stop 84, with this portion of the brake band released from the drum, thereby confining the further expansion of the brake band to the balance of the brake band and insuring radial movement thereof from the brake drum to release the brake drum throughout the length of the brake band.

A series of spring drums 91, 92, 93, which may also be termed spring motors, are connected in series, one end of the series being connected with the reel 31 to normally wind the flexible connection 32, the other end of the series being connected with the stationarily positioned axle 26 as an anchor. The reel 31 has an end wall 94, and is provided with a laterally extending annular flange 95, forming a pocket 96 of the spring drum 91, in which a spring 97 is located. The spring drum 92 has a pocket 98 formed by an end wall 99 and an outer endwise extending annular flange 100 for a spring 101, and having an endwise extending hub 102 at the other side of said end wall, the outer annular flange 100 and the hub 102 extending in opposite directions from said end wall 99. The spring drum 93 has a pocket 105 formed by an end wall 106, provided at one side thereof with an outer lengthwise extending annular flange 107, and an inner lengthwise extending hub 108 extending lengthwise from the opposite side of said wall, the outer peripheral flange 107 and the hub extending in opposite directions from said wall. A spring 109 is located in this pocket. The hubs of the respective spring drums are received in the pockets in advance thereof and each of the pockets has a spring located therein. These springs are shown as flat spiral springs. The springs are preferably of equal strength and tension to readily raise the dropper head and the parts connected therewith after discharge of the carcass.

The outer ends of the respective springs are provided with attaching means, shown as a hook 111 on the end of the spring, received over a lug 112 in the flange about the spring, the other end of the spring being provided with fastening means securing it to the portion within the same shown, as a hook 113 on the spring received about a lug 114 on the part within the spring, namely, the hubs 102, 108 for the first two of said springs, and a lug 115 of a collar 116 fastened as by a key 117 to the axle 26 for the third of said springs. The first of these springs has its outer end secured to the sheave 31 and its inner end secured to the hub of the intermediate spring drum 92. The second of said springs has its outer end secured to said last-named spring drum and the hub of the next spring drum 93. The spring within said last-named spring drum has its outer end secured to the outer flange of said spring drum and its inner end secured to the axle to provide an anchor for one end of said series of springs. This arranges these springs in series so that a flexible connection 32 may be wound about its sheave and have a length at least as great as the sum of the yield permitted by said successive springs. If a greater length of movement of flexible connection is desired one or more additional intermediate spring drums and springs may be interposed in the line of spring drums, these additional spring drums and springs being also arranged in series and similarly mounted and connected. The hubs of the spring drums form bearings about the axle 26 for rotation of the spring drums. The spring drums are shown in line with each other. The outer end of the outer spring drum is closed by a closing plate 118 located about the axle between said spring drum and the pillow block.

If it is desired to adjust the tension of these springs, the bolt 29 is removed and the axle 26 is rotated in the proper direction by means of manually moving the arm 27 for supplying additional or less tension to the springs, and the arm is again secured in adjusted position by means of the bolt 29. The outer end of the arm is provided with a handle 119 for the purpose.

The outer end of the flexible connection or cable 32 is secured to a dropper head for the support of the carcass or parts thereof to be lowered. This dropper head is exemplified as comprising a hook 125 provided with a shank 126, the upper end of which has securing connection 127 with the outer end of the flexible connection 32. The flexible connection is exemplified as a cable, the end thereof being secured and leaded in a socket 128 in the shank 126.

The shank 126 is arranged to have endwise movement into and out of a bearing 129 in a housing 130, provided with flanges 131, bolts 132 extending through said flanges into the timber structure 13 and the frame 11 for securing said frame and said housing relative to each other. The flexible connection and its connection with the dropper head permit swiveling movement of the dropper head and guidance of the dropper head in any desired direction by the operative to locate the weight or carcass suspended thereon in desired position, as on the floor above which the device is located. The shank 126 and so much of the flexible connection as is required to properly lower the dropper head are arranged to pass down and up through the bearing for lowering the dropper head to desired extent and again raising it to normal position.

The dropper head is arranged to be raised into proper relation with the track rail 14 when employed in connection with said rail. It is provided with a rail section 133 so constructed as to form substantially a continuation of the track rail and is arranged to receive the roller 16 of the holder 17 from the track rail so as to locate said holder and the weight depending therefrom on said dropper head.

This dropper head is provided with an outwardly bowed portion 134, having a depression 135 along the inner walls of which the rail section 133 is continued, said bowed portion and track section bein garranged to be located in line with the track rail. The depression is preferably so located and of such form as to position the axis of the roller of the holder in line with the axis of the shank of the dropper head so as to locate the center of gravity of the weight suspended from the holder in line with the axis of the shank, and the hook 125 is also so located with relation to said axis so that its center of gravity is in line with said axis of said shank. The dropper head forms a hook with an open end or mouth 136 arranged to be placed in line with the track rail.

In order to position the open side of the dropper head in line with the track rail when the dropper head is raised, the shank and its bearing are provided with cooperating parts for arranging the dropper head in the plane of the track, and at such height so that the hanger supporting portion of its track section is on a level and in line with the hanger supporting portion of such track rail, in order that the holder may be rolled from the track rail into the dropper head when the dropper head is in up position. The positioning means are exemplified as an elongated tongue or key 140 secured to the shank and arranged to be received in a groove or slot 141 located in and extending lengthwise of the inner wall of the bearing 129. This inner wall is at its lower end provided with a recess 142 having curved walls 143, 144, at the sides of said slot and forming a widening mouth for said slot. These walls are shown helically or cam formed at said respective sides of the slot and approach each other at the side of said wall opposite the slot, to form a rather sharp end wedge 145 having said walls at the respective sides thereof, and arranged to be contacted by the upper end of the key 140, which is provided with an upper wedge end 150, so that said key is directed toward said slot from either side thereof to locate said dropper head with its open side or mouth 136 toward the track rail when the dropper head is raised to normal position. The shank of the dropper head locates the dropper head centrally in its bearing and the coaction of the key with the cam faces and side walls of the slot 141 locates the mouth 142 of the dropper head and its rail section 133 in proper direction and relation with the track rail.

The lower end of the shank 126 has an annular flange 146 radiating therefrom, the upper face of which has an annular shoulder 147 which engages the lower end of the bearing 129 and a contracting centering portion 148 inside said annular flange, this centering portion being shown frusto conical and coacting with the outer annular wall of a rabbet 149 in the lower end of said bearing concentric with said bearing to aid in centering the shank and the dropper head in said bearing.

A safety stop 151 is provided for arresting movement of the next succeeding holder 17 on the track rail toward the normal position of the dropper head to prevent the holder from moving off the track rail when the dropper head has been lowered. This safety stop is controlled by the location of the dropper head. It is exemplified as a U-shaped bar having a cross member 152 arranged to be placed crosswise of the track rail in position to arrest movement of the holder toward the open end of the track rail. Arms 153 extend from said cross member at the respective sides of the dropper head and are pivoted to the housing 130 by means of a pin 154 extending through bearings 155 in said respective arms and bearings 156 formed as lugs on the housing, the pin being held endwise in said bearings by means of suitable cotter pins 157 in said pin. The arms 153 extend beyond said pivotal connection, the outer ends thereof being connected by a pin 158 threaded at its respective ends and having a separating sleeve 159 thereabout, nuts 160 being threaded to the respective ends of said pins to clamp the parts rigidly together and provide a firm stop structure. The outer end of this structure also forms a handle by means of which the safety stop may be manipulated. The end of the safety stop having the cross member 152 thereon normally descends by gravity into obstructing position.

The dropper head is provided with laterally extending lugs 161 arranged to engage said safety stop during the final portion of retracting movement of the dropper head to normal position for raising the safety stop away from the track rail to sufficient extent to permit the next holder to pass the same on to the hook portion of the dropper head which has in the meantime been raised to normal position. When the dropper head is lowered the lugs 161 move away from the safety stop and the safety stop moves into obstructing position to arrest the movement of any holder toward the then open end of the track rail.

In operation, the dropper head and the safety stop are normally in raised relation, giving the carcass holder free access to the dropper head and allowing the holder to be moved lengthwise of the track rail on to the rail section in the dropper head. The brake is normally in applied relation and supports the dropper head and its burden in raised relation. In order to lower the carcass or other burden and the dropper head, the operator pulls down on the handle 79 to sufficient extent to release the brake for lowering the dropper head and its load by gravity at the desired speed, the operator having full control of the lowering by manipulation of the handle for lowering of the dropper head and its load at the desired speed or stopping the lowering or dropping thereof temporarily at any point in its passage or when the load has reached its lowermost position desired.

During this dropping or lowering of the dropper head and its load, the springs in the spring housings are wound, the winding of the respective springs being in series so as to permit extreme length of drop within a minimum range of springs occupying minimum space. The winding of the spring is communicated from the reel to the outer end of the first of the springs, which exerts a winding force at its inner end upon the hub of the second spring drum for exerting winding movement upon the spring in the intermediate spring drum from its outer end inwardly to the hub of the outer spring drum, which is thereby rotated for winding up the spring in the outer spring drum from its outer periphery toward the stationary axle at the inner end thereof.

When the carcass or load has been entirely dropped or lowered, the operator releases the handle 79 whereby the brake is firmly applied to the brake drum for holding the springs in wound relation. The carcass or load and its holder having been removed from the dropper head, the operator again urges the handle 79 downwardly to relieve friction contact between the brake band and its drum to desired extent in order to release the brake drum sufficiently so that the springs will unwind and thereby rewind the flexible connection or cable 32 upon its reel or sheave, this being accomplished to the extent and at the speed desired by the operator by the manipulation of said handle. During such winding the unwound portion of the flexible connection moves through the bearing 129 followed by the shank 126 of the dropper head.

When the upper end of the shank enters its bearing, the shank is centered in the bearing, and the key 140 in the shank contacts the cam guide at the lower end of the bore of the bearing and is directed from its apex 145 toward either side of said apex toward the slot 141 in said bearing, thereby directing the entering end or mouth of the dropper head toward the track rail and bringing the same in line with said track rail.

The continuing upward movement of the dropper head by the springs raises the dropper head until the flange 146 at the lower end of the shank is arrested by the lower end of the bearing at the height at which the upper face of the track section in the dropper head is in line with the upper face of the stationary track rail, at which point the dropper head is stopped, the lower end of the guided portion of the dropper head being centered in said bearing by the contracting centering portion 148. At the latter portion of upward movement of the dropper head the lugs 161 thereon engage the safety stop and raise the safety stop out of the way of an approaching carcass holder for permitting the holder to enter upon the trackway of the dropper head. This safety stop drops into obstructing relation at the beginning portion of the downward movement of the dropper head.

The arms of the safety stop are provided with an outward bend 162 located near its pivot so that the swinging portion of said safety stop may be substantially parallel with the lower face of the timber structure when in retracted position so as to provide maximum clearance thereunder for the passage of the holder 17.

I claim:

1. In a dropper, the combination of a series of spring motors connected in series about a common axis, a reel about said common axis for a flexible connection to receive a load and having operative connection with one end of said series, an anchor for the other end of said series, the springs of said motors being serially operatively connected end to end, means for rotatively adjusting said anchor whereby to adjust the tensions of the springs in all said spring motors, and a brake having operative connection with said reel to control rotation thereof.

2. In a dropper, the combination of a reel for a flexible connection arranged to sustain the load, a motor having attachment with said reel to store power in said motor by unwinding of said reel for return of said reel to normal position, a brake drum having attachment with said reel, a brake band thereabout, and a brake lever having a pivot in a position radial with relation to and outside of said brake drum and adjacent to said brake drum, the respective ends of said brake band having articulating connections with said brake lever at the respective sides of said pivot and at substantially unequal distances therefrom whereby said brake band is moved annularly about said brake drum and said articulating connections are moved at different speeds with relation to said brake drum for various tensions of said brake band on said brake drum to qualify the rotations of said reel.

3. In a dropper, the combination of a reel for a flexible connection arranged to sustain the load, a motor having attachment with said reel to store power in said motor by unwinding of said reel for return of said reel to normal position, a brake drum having attachment with said reel, a brake band thereabout, and a brake lever having a pivot in a position radial with relation to and outside of said brake drum and adjacent to said brake drum, the respective ends of said brake band having articulating connections with said brake lever at the respective sides of said pivot and at substantially unequal distances therefrom whereby said brake band is moved annularly about said brake drum and said articulating connections are moved at different speeds with relation to said brake drum for radial movement of said brake band with relation to said brake drum, and a stop adjacent the end of smallest radial movement of said brake band to equalize the radial movement of the respective portions of said brake band with relation to said brake drum to control the rotations of said reel.

4. In a dropper, the combination of an axle, a reel, an anchor, a plurality of spiral springs having operative connections in series with each other and with said reel and said anchor at opposite ends of said series of springs and axially arranged about said axle, a brake operatively connected with said reel, and a flexible connection having one of its ends attached to said reel, and said flexible connection outside said reel arranged to support a load and to wind said springs in series by the descent of said load, and said springs by the unwinding thereof and after release of said load rewinding said flexible connection on said reel.

5. In a dropper, the combination of a normally non-rotative axle, a reel, a plurality of spiral springs having operative connections in series with each other and with said reel and said axle at opposite ends of said series of springs and axially arranged about said axle, a brake operatively connected with said reel, a flexible connection having one of its ends attached to said reel, and said flexible connection outside said reel arranged to support a load and to wind said springs in series by the descent of said load and said springs by the unwinding of said reel and after release of said load, rewinding said flexible connection on said reel, and means to adjust the tension of all said springs by the rotation of said axle.

6. In a dropper, the combination of a dropper head for a holder movable on a track rail, said dropper head provided with a rail extension of said track rail for reception of said holder therefrom, said dropper head provided with a mouth normally presented toward said track rail, a flexible connection having attachment with said dropper head, means whereby to control winding and unwinding of said flexible connection for elevational relation of said dropper head, means to angularly position said dropper head, and means to limit elevation of said dropper head, constructed and arranged to present said rail extension in line with said track rail when said dropper head is in elevated position, a safety stop for the holder to obstruct movement of the holder on said track rail toward the end of said track rail when said dropper head is in lowered position, and means acted on by elevation of said dropper head and coacting with said safety stop to move said safety stop out of obstructing relation upon elevated normal position of said dropper head.

7. In a dropper, the combination of a dropper head provided with a shank and a bearing into and out of which said shank is arranged to move in elevational direction, said dropper head provided with a receiving part normally in line with a track rail, said bearing and said shank provided with a coacting tongue and groove extending lengthwise thereof and laterally extending cam guiding walls at the respective sides of said tongue and grooves directing coaction between said tongue and groove by axial movement between said shank and said bearing for placing said receiving part in line with said track rail.

8. In a dropper, the combination of a dropper head provided with a shank and a bearing into and out of which said shank is arranged to move in elevational direction, said dropper head provided with a receiving part normally in line with a track rail, said shank provided with a tongue and the wall of the bore of said bearing provided with a groove into which said tongue is moved for placing said receiving part in line with said track rail, and said wall provided with oppositely extending cam faces extending toward said groove to direct said tongue into said groove from opposite sides of said groove.

9. In a dropper, the combination of a dropper head provided with a shank and a bearing into and out of which said shank is arranged to move in elevational direction, said dropper head provided with a receiving part normally in line with a track rail, said shank provided with a tongue and the wall of the bore of said bearing provided with a groove into which said tongue is moved for placing said receiving part in line with said track rail, and said wall provided with oppositely extending cam faces extending toward said groove from an apex which is in said wall opposite said groove to direct said tongue into said groove from opposite sides of said groove.

10. In a dropper, the combination of a dropper head provided with a shank and a bearing into and out of which said shank is arranged to move in elevational direction, said dropper head provided with a receiving part normally in line with a track rail, said shank provided with a tongue and the wall of the bore of said bearing provided with a groove into which said tongue is moved for placing said receiving part in line with said track rail, said wall provided with a cam face extending toward said groove to direct said tongue into said groove, and said dropper head at the lower end of said shank provided with a centering part and said bearing provided with a centering part coacting therewith to center the lower end of said shank in said bearing.

11. In a dropper, the combination of a dropper head provided with a shank and a bearing into and out of which said shank is arranged to move in elevational direction, said dropper head provided with a receiving part normally in line with a track rail, said shank provided with a tongue and the wall of the bore of said bearing provided with a groove into which said tongue is moved for placing said receiving part in line with said track rail, and said wall provided with oppositely extending cam faces extending toward said groove from an apex in said wall opposite said groove and the upper end of said tongue provided with a wedge formation coacting with said apex and said respective cam faces to direct said tongue into said groove from opposite sides of said groove.

12. In a dropper of the character described, the combination of a series of spring motors about a common axis, a reel about said common axis to receive a load, said spring motors comprising springs serially arranged about said common axis, and an anchor at one end of said series of springs, said reel being connected with the other end of said series of springs, said reel and said anchor forming end members, the respective end ones of said series of springs having operative connections at their opposite ends respectively with said reel and said anchor and the intermediate ends of said springs having operative connections with each other to transmit force from one of said end members to the other of said end members through said springs and all of said operative connections.

13. In a dropper, the combination of a series of spring motors about a common axis, a reel about said common axis to receive a load, said spring motors respectively comprising a frame having a hub and a spring, said springs serially arranged about said common axis, and an anchor at one end of said series of springs, said reel being connected with the other end of said series of spring motors, said anchor forming a hub, said hubs located about said common axis and all said hubs projected toward said reel, opposite ends of the end ones of said series of springs having operative connections with said reel and said anchor respectively and the intermediate ends of said springs having operative connections with said hubs and said frames to serially connect said reel, said hubs and frames and said anchor to transmit force from one to the other of said reel and said anchor.

14. In a dropper of the character described, the combination of a reel, a series of spring motors respectively comprising a frame having an annular rim to form a pocket in said frame and a spiral spring in said pocket, all said pockets opening in the same direction, said reel and said spring motors and their springs serially located about a common axis, successive frames provided with hubs in the pockets of preceding frames, and an anchor in the end one of said pockets, said reel having attachment with an end one of said frames so as to rotate the same with it, said hubs and said anchor provided with hooks projected in similar directions about said axis, said rims provided with hooks projected in opposite directions thereto about said axis, and the opposite ends of said spiral springs provided with hooks projected in opposite directions to coact with said other hooks mentioned and located to interhook therewith by rotation of said reel in winding direction.

15. In a dropper of the character described, the combination of a reel, a series of spring motors respectively comprising a frame having an annular rim to form a pocket in said frame and a spiral spring in said pocket, all said pockets opening in the same direction, said reel and said spring motors and their springs serially located about a common axis, successive frames provided with hubs in the pockets of preceding frames, an anchor in the end one of said pockets, said reel having attachment with an end one of said frames so as to rotate the same with it, said hubs and said anchor provided with hooks projected in similar directions about said axis, said rims provided with hooks projected in opposite directions thereto about said axis, and the opposite ends of said spiral springs provided with hooks projected in opposite directions to coact with said other hooks mentioned and located to interhook therewith by rotation of said reel in winding direction, and means to adjust said anchor about said axis to adjust the tension of all said springs.

OSCAR C. SCHMIDT.